(12) United States Patent
Packard et al.

(10) Patent No.: US 9,050,537 B2
(45) Date of Patent: Jun. 9, 2015

(54) METHOD AND SYSTEM FOR AN ONLINE PERFORMANCE SERVICE WITH RECOMMENDATION MODULE

(71) Applicant: THUUZ, LLC

(72) Inventors: Warren Joseph Packard, Palo Alto, CA (US); Dan Lythcott-Haims, Palo Alto, CA (US); Robert John Barcklay, Berkeley, CA (US)

(73) Assignee: THUUZ, INC., Palo Alto, CA (US)

( * ) Notice: Subject to any disclaimer, the term of this patent is extended or adjusted under 35 U.S.C. 154(b) by 0 days.

(21) Appl. No.: 13/969,437

(22) Filed: Aug. 16, 2013

(65) Prior Publication Data
US 2013/0337920 A1 Dec. 19, 2013

Related U.S. Application Data

(62) Division of application No. 13/037,243, filed on Feb. 28, 2011, now Pat. No. 8,535,131.

(60) Provisional application No. 61/308,927, filed on Feb. 27, 2010.

(51) Int. Cl.
*A63F 9/24* (2006.01)
*A63F 13/00* (2014.01)
*G06F 17/00* (2006.01)
*G06F 19/00* (2011.01)
*A63F 13/30* (2014.01)
(Continued)

(52) U.S. Cl.
CPC .............. *A63F 13/12* (2013.01); *H04N 21/251* (2013.01); *H04N 21/23418* (2013.01); *H04N 21/25891* (2013.01); *H04N 21/8126* (2013.01)

(58) Field of Classification Search
USPC .............. 463/1, 20, 30, 42, 40; 705/1, 11, 14; 273/292
See application file for complete search history.

(56) References Cited

U.S. PATENT DOCUMENTS 7,788,358 B2 * 8/2010 Martino ........................ 709/223
2003/0101091 A1 * 5/2003 Levin et al. .................... 705/11
(Continued)

OTHER PUBLICATIONS

Office Action dated Mar. 29, 2013, U.S. Appl. No. 13/037,243.
(Continued)

*Primary Examiner* — Adetokunbo O Torimiro
(74) *Attorney, Agent, or Firm* — Vierra Magen Marcus LLP

(57) ABSTRACT

A method and system to recommend performances based on the performances' excitement-level as determined from events and characteristics associated with the performance and a subscriber's preference is described herein. A subscriber's preference influences the performance type and performance characteristics that are exciting to the subscriber. Recommendations for performances can be sent to the subscriber as a link or direct connection to a location of the online performance. Recommendations of a performance preserve the excitement of the performance by not revealing the score, outcome, or any statistics or commentary that would spoil the natural buildup of excitement from watching the live performance. Performance recommendations may include a start-time and end-time for watching only the exciting portions of the performance. Recommended portions of performances can be ranked to fit within a subscriber's customizable viewing-time, so that a subscriber can view only the most exciting portions of performances that fit within a limited time-frame.

20 Claims, 5 Drawing Sheets

(51) Int. Cl.
*H04N 21/25* (2011.01)
*H04N 21/234* (2011.01)
*H04N 21/258* (2011.01)
*H04N 21/81* (2011.01)

(56) References Cited

U.S. PATENT DOCUMENTS

2007/0100699 A1* 5/2007 Ajizadeh .................... 705/14
2009/0131165 A1* 5/2009 Buchner et al. ............. 463/30
2009/0216547 A1* 8/2009 Canora et al. ................ 705/1
2011/0212756 A1 9/2011 Packard

OTHER PUBLICATIONS

Response to Office Action dated Apr. 29, 2013, U.S. Appl. No. 13/037,243.
Notice of Allowance dated Jul. 2, 2013, U.S. Appl. No. 13/037,243.

* cited by examiner

306a
Event A = Summation of a weighted average of Pace values and
Score   Closeness values, plus a summation of Novelty Values $$= \sum[(Avg(w_1) P1 \pm \sigma) + (Avg(w_2) P2 \pm \sigma) + \ldots (Avg(w_{99}) Pn \pm \sigma)] +$$

$$\sum[(Avg(w_a) C1 \pm \sigma) + (Avg(w_b) C2 \pm \sigma) + \ldots (Avg(w_z) Cn \pm \sigma)] +$$

$$\sum[N1 + N2 + \ldots Nn]$$

Performance 1 = Event A + Event B ... Event Z
Score          Score     Score        Score
               306a      308a         312a

METHOD AND SYSTEM FOR AN ONLINE PERFORMANCE SERVICE WITH RECOMMENDATION MODULE

PRIORITY CLAIM

This application is a divisional application of U.S. patent application Ser. No. 13/037,243, entitled "Method And System For An Online Performance Service With Recommendation Module," filed Feb. 28, 2011 which claims priority to Provisional Application No. 61/308,927, filed Feb. 27, 2010, both of which are herein incorporated by reference.

BACKGROUND

Over the last several years, technology has transformed the way we consume information. Particularly for the sports community, technology has expanded the ways that sports fans can watch and appreciate sports performances. However, the ubiquity of digital video recording, web video streaming, and cloud-based storage of performances and performance segments has created unmet potential for the avid sports fan.

Using modern technology, it is now possible to watch most sports performances in either real-time or at a later point in time ("time-shifted"). A digital video recorder ("DVR") or personal video recorder ("PVR") is a consumer electronics device or application software that records video in a digital format to a disk drive, USB flash drive, SD memory card or other local or networked mass storage device. DVRs include, for example, set-top boxes with recording capability, portable media players ("PMP") with recording capability, and software for personal computers that enables video capture and playback to and from disk. For many individuals, time shifting or streaming sports performances have become the rule rather than the exception. However, with so many performances available for future consumption, knowing which performances to watch and which to avoid has become a problem.

There are many services that provide game highlights, box scores, and performance commentary, but all of these services spoil the excitement of any recorded sports performances by revealing the score, statistics, and/or highlights of what transpired. A fan seeking to watch highlights of a game that he or she missed is typically told or shown the outcome of the performance before or during the highlight, causing the fan to miss out on the excitement of experiencing the buildup of game events as they unfold.

Additionally, with the amount of performances available over the Internet and/or time-shifted to a DVR, sports fans can spend precious hours viewing a boring game or one that simply turns out as expected. Furthermore, what may be an exciting event for one sports fan may be uneventful to another sports fan. Currently available services merely broadcast a game's highlights without considering the myriad preferences of the game's audience, resulting in the inefficient use of the sports fans' time, a potential decrease in advertisement revenue, and the loss of viewership.

SUMMARY

Introduced herein are a method and a system for recommending live and/or recorded performances to a subscriber based on the performances' excitement level (also referred to as a "performance score"). A performance can mean any action or content that has an element of suspense, surprise, and/or competitiveness associated with it. For purposes of explanation, a performance is commonly described herein as a sports performance; however, a performance can be a reality TV, a news event, a game show, political action, a business show, a drama, a sport, and other episodic content, for example.

In one embodiment, a recommendation module determines an excitement level for a performance based on discrete events occurring related to the performance. For instance, a discrete event can be internal to the performance, such as a touch down, or the discrete event can be external to the performance, such as player commentary occurring after or before a performance. The events are each scored by grading characteristics for a respective event.

An event characteristic (or simply a "characteristic") is a specific, gradable aspect of an event. For example, a game can have characteristics such as a score volatility, a narrow score margin, an upset within a performance, an unexpected score, a history score, a performance event's pacing, a closeness of scores, or a performance's novelty. Some performances have unique characteristics, such as a specific number of field goals scored in a football game, or runs batted in ("RBI") in an inning of a baseball or softball performance. Other characteristics can be generalized to accommodate different types of events and/or performances other than games.

A particular characteristic, such as an event's pacing or history, for example, may have sub-characteristic values. For example, a single event occurring during a football performance may include a short drive leading to a game-winning touchdown. Within this drive (the "event"), several of the football plays can be characterized as having a certain pace value. For instance, a no-huddle offensive play can be characterized as having a high pace value, and another play within that same event might be characterized as having a low pace value. Each of the sub-characteristic pace values are used to determine the overall pace characteristic score, which is used to determine the overall characteristic score for the event.

In one embodiment, sub-characteristic values of a particular characteristic can be averaged together as part of a function to determine the overall characteristic score. In another embodiment, weights can be applied to one or more of the sub-characteristic values to influence the significance of that sub-characteristic in the overall characteristic score. Additionally, the characteristic values can be normalized so that the total of the sub-characteristic values are approximately equal to a certain value.

The overall excitement level of a performance is, therefore, a function of the scores that are applied to event characteristics within the performance. The recommendation module can rank multiple performances based on the individual excitement levels associated with each performance.

In some embodiments, one or more ranked performances are recommended to a subscriber of an online recommendation service. The online recommendation service may be a commercial service or a free service in which a subscriber can create and store a profile containing his or her preferences. A subscriber preference can describe the subscriber's likes and dislikes for a particular type of performance, such as auto racing, for example. Additionally or alternatively, a subscriber preference can specify the type of event or feature associated with a performance that a subscriber finds particularly exciting, such as a crash within an auto racing performance, the occurrence of a fight during (or after) a hockey game, a particular player or venue, or even the type of weather, for example.

Subscriber preferences can then influence the recommendation(s) made to the subscriber by increasing or decreasing the importance that a subscriber-preferred characteristic has on affects the excitement level of the performance relative to that particular subscriber.

In an exemplary embodiment, the online performances can include recorded sports performances that are accessible to the subscriber through a network, such as the Internet. Discrete events within each sports performance are scored based on sports characteristics. A sports characteristic can be generic and apply to multiple sports or unique to a particular sport, such as a number of home runs in a baseball game. The excitement level of the sports performance is determined based on a function of the sports performance's discrete events. A recommendation of one or more performances can be made to a particular subscriber based on the subscriber's preferences. Subscriber preferences can include, for example, a preferred sport, a preferred characteristic of a particular sport, and/or other preferential choices.

A recommendation for one or more performances can thus preserve the excitement of the performance by not revealing the score of the performance, performance-statistics, or other spoilers, so that the excitement of the performance can be naturally experienced by the subscriber, who may be unaware of the outcome.

In one embodiment, a personalization module provides a time to start watching an exciting event related to a performance (a "watch-from-time"). The watch-from-time precedes a peak excitement level that has been determined for the exciting event so that the subscriber can experience the build up leading to the peak excitement level.

Similarly, a watch-to-time can be provided by the personalization module. The watch-to-time corresponds to the time occurring after the peak excitement level of the exciting event has ended to indicate the time to stop watching the performance. A single performance can have multiple watch-from-times and corresponding watch-to-times, each associated with an occurrence of the exciting event associated with the performance.

In one embodiment, one or more performances are recommended to a subscriber based on the subscriber's available time for consuming performances (referred to as a "viewing-time"). The viewing-time is a subscriber-selected or automatically determined duration of time that influences the quantity and length of performance events that are recommended to the subscriber.

In some embodiments, viewing-times can be combined to construct a list of tailored segments that fit within the subscriber's total available viewing-time. For example, a subscriber may have a preference for baseball, basketball, and college football, but not soccer or any game having a low score. If the subscriber in this example has 45 minutes of viewing-time, then the personalization module can limit recommendations to exciting segments conforming to that subscriber's preferences. In this scenario, the personalization module may recommend, for example, two highly ranked baseball performances, each having two exciting five-minute segments; a single basketball performance having three exciting segments, each lasting five minutes; and a single college football performance with one exciting ten-minute drive that leads to a tie-breaking touchdown.

In a further embodiment, a content directory points a subscriber to the location of the recommended games. A recommended game can be stored and streamed to the subscriber from a computer, on the Internet, DVR, PVR, and/or be accessible via delayed replay through traditional television, cable, satellite, and other content service providers, for example.

In one embodiment, a programming module populates the content directory by automatically programming a subscriber's DVR, or other media recording device, to record one or more recommended broadcast performances for time-shifted playback.

In one embodiment, an advertising module works in conjunction with the personalization module to provide advertisers and sponsors with a means of communicating relevant ads specifically matched to a specific subscriber's demographics. In another embodiment, the advertising module can process a fee from a third-party for redirecting a subscriber to content associate with the third-party.

The solutions presented herein overcome the limitations of the prior art by identifying and referring to a subscriber real-time and/or time-shifted performances that are "great" or "exciting" while considering the subscriber's preferences and without revealing the performances' outcome in advance, thus spoiling the suspense and/or excitement of the performance.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Figure 1:
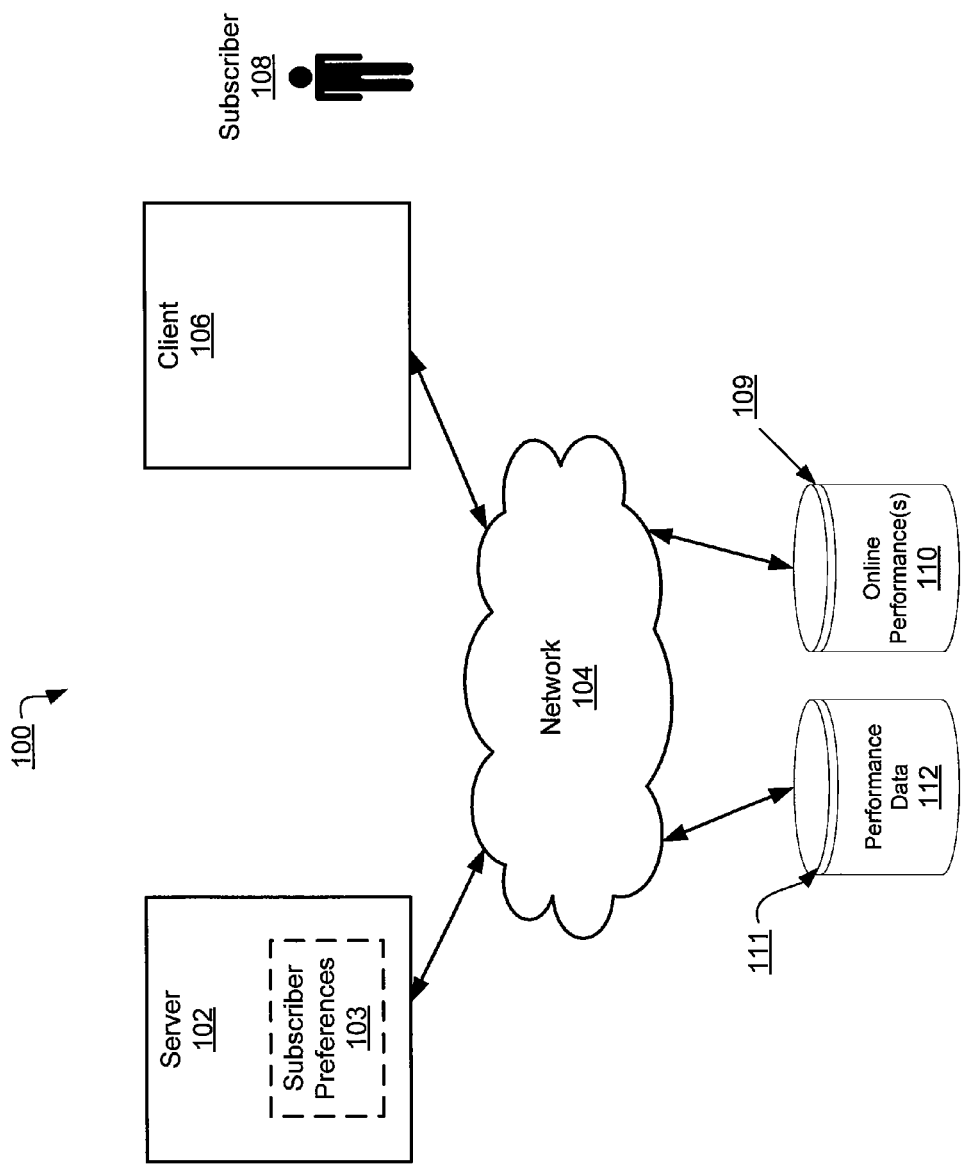
FIG. 1 illustrates an online recommendation system.

FIG. 1 illustrates an online recommendation system 100 in which the techniques introduced herein can be implemented. The online recommendation system 100 has a recommendation server 102 connected via a network 104 to online performances 110, performance data 112, and a client system 106 accessible to a subscriber 108.

The recommendation server 102 may be, for example, a conventional computing system such as a personal computer ("PC") or server-class computer. As further described below, the recommendation server 102 can rank performances 110 based on subscriber preferences 103 and performance data 112. Ranked performances can be recommended to a subscriber 108 without revealing the outcome of the performance(s) 110 or the outcome of events related to a particular performance, so that the excitement of the performance(s) 110 is not prematurely undermined.

The recommendation server 102 can connect to the client system 106 to access the performance data 112 and performances 110 via the network 104. The network 104 can utilize any connection method known in the art, such as Ethernet, Token Ring, Fiber Distributed Data Interface (FDDI), or Transmission Control Protocol/Internet Protocol (TCP/IP), or a combination thereof. For example, the network 104 may be an intranet or the Internet, or a combination thereof. Although the network 104 is shown as a single entity, the network 104 can be multiple networks configured to allow communication between each of the multiple networks and the recommendation server 102, and the client system 106 to access the performance data 112 and performances 110. The network 104 can manage the communications between the recommendation server 102 and the client system 106 to access the performance data 112 and performances 110 by routing data, for example in the form of packets, between those devices (102, 106).

Performances 110 are online performances stored on a storage device 109 that is accessible to the recommendation server 102 and client system 106 via the network 104. The storage device 109 may be any media storage device known in the art. The storage device 109 stores performances 110 in support of the techniques introduced here. The storage device 109 can be implemented on one or more disks (e.g., a RAID group) or any other type of mass storage device(s). Alternatively, or additionally, performances 110 may be stored on any type of attached array of writable storage media, such as magnetic disk or tape, optical disk (e.g., CD-ROM or DVD), flash memory, solid-state disk (SSD), electronic random access memory (RAM), micro-electro mechanical media and/or any other similar media adapted to store information. The storage device 109 may be external to the recommendation server 102 or internal (not shown). However, as illustratively described herein, the performances 110 are stored on a single, external non-volatile mass storage device 109.

A performance 110 can be any media content that has an element of suspense, surprise, and/or competitiveness associated with it, such as reality TV, a news event, game shows, business shows, dramas, sports, and other episodic content, for example.

Examples of performances relating to a news event can include, for example, a political campaign, government action, political movement and/or unrest (e.g. a petitioning of the government, uprising, or revolution), court cases, natural events (e.g. weather, and natural disasters), marketplace transactions, and policy changes/discussion.

Examples of sports performances can include, for example, football, baseball, basketball, soccer, hockey, tennis, rugby, wrestling, motor sports, board sports, bowling, cycling, cricket, golf, Olympic sports, volleyball, and combat sports performances.

In one embodiment, a performance 110 may be stored in a format so that the performance 110 may be streamed via the network 104 to the client system 106. Alternatively, an entire performance 110 may be downloaded from the storage device 109 for viewing at the client 106 by the subscriber 108. In one embodiment, selectable portions of a performance 110 can be separately streamed and/or downloaded to the client system 106 without downloading or streaming the entire portion of the performance 110. For example and as further explained below, one or more events related to the performance 110 can be viewed at the client system 106 independently and separately from other events associated with the performance, or from the entirety of the performance 110.

Performance data 112 includes information about a performance 110. The information can include unstructured and/or structured information containing details about the performance 110, such as statistics about events happening during the performance 110. In one embodiment, performance data 112 may describe the individual play or action of a game in a structured way, providing information such as game clock time, position on the field, type of play, players involved, player statistics, and current team scores. This information can be used in a variety of ways to quantify the characteristics of the performance that can be used by the recommendation module, as explained below. The performance data 112 can be stored on a storage device 111 that is accessible to the recommendation server 102 and client system 106 via the network 104. The storage device 111 may be any media storage device known in the art. The storage device 111 stores performance data 112 in support of the techniques introduced here. The storage device 111 can be implemented on one or more disks (e.g., a RAID group) or any other type of mass storage device(s). Alternatively, or additionally, performances data 112 may be stored on any type of attached array of writable storage media, such as magnetic disk or tape, optical disk (e.g., CD-ROM or DVD), flash memory, solid-state disk (SSD), electronic random access memory (RAM), micro-electro mechanical media and/or any other similar media adapted to store information. The storage device 111 may be external to the recommendation server 102 or internal (not shown). However, as illustratively described herein, the performance data 112 is stored on a single, external non-volatile mass storage device 111.

The client 106 may be a conventional computing device, such as a PC, server-class computer, smartphone, tablet computer, TV, set-top box, or other type of computing system capable of connecting to the network 104, either by a wire or wirelessly. Alternatively, the client system 106 can be a DVR, PVR, or other media recording device capable of receiving performances 110 that are recommended by the recommendation server 102.

As further explained below, the subscriber 108 may send, from the client system 106 to the recommendation server 102, one or more subscriber preferences 103. A subscriber preference 103 can be used by the recommendation server 102 to determine the subscriber-specific excitement level for recommended performances.

Within the online recommendation system 100, any other suitable number of servers, clients, networks and/or mass storage devices may be employed.

Figure 2:
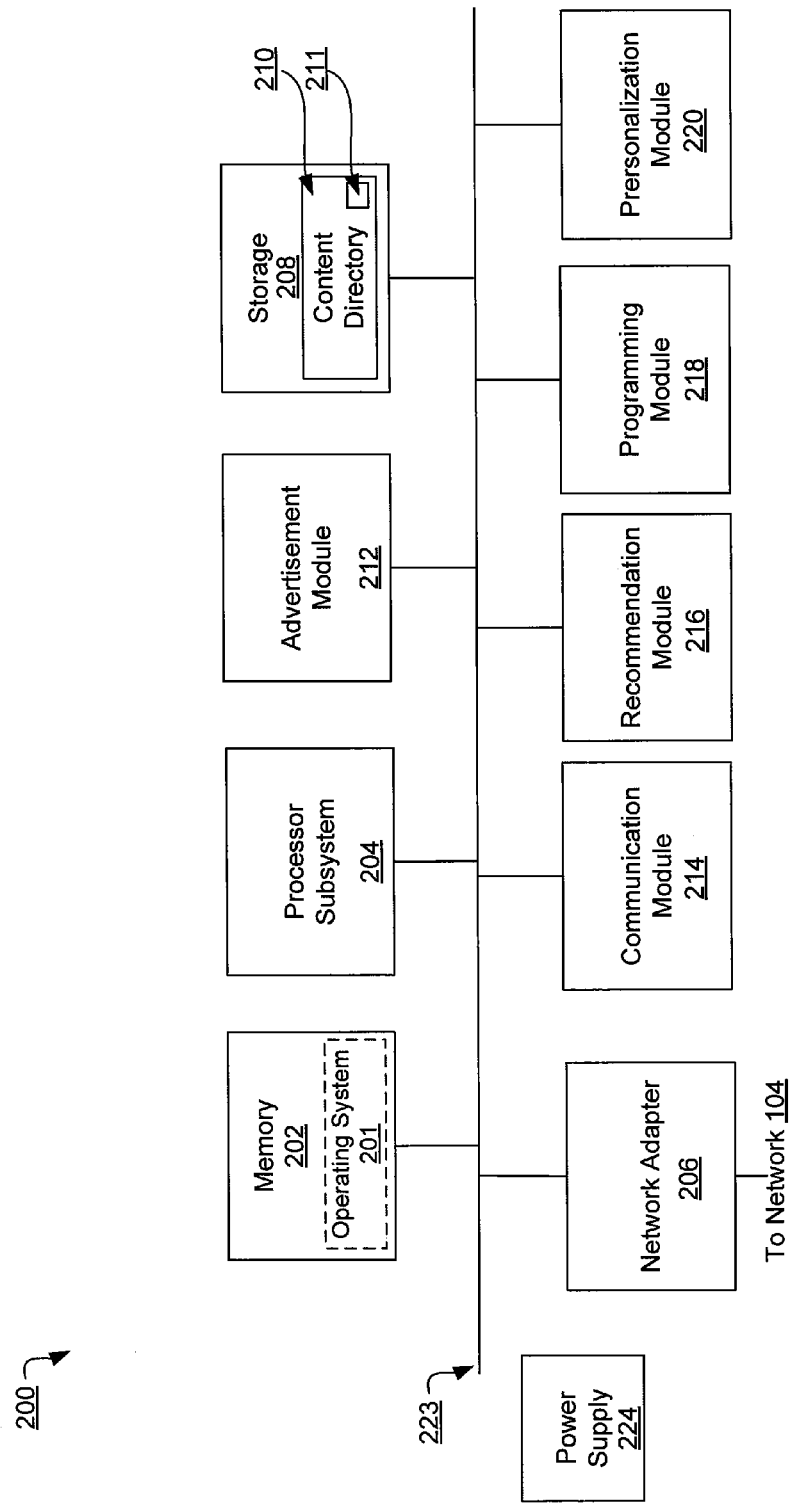
FIG. 2 is a high-level block diagram showing an example of the hardware architecture of a recommendation server.

FIG. 2 is a block diagram of one embodiment of the internal server architecture ("server architecture") 200 of the recommendation server 102 that can be used to implement one or more of the features of the disclosed techniques. In the illustrated embodiment, the server architecture 200 is a computer system that includes a processor subsystem 204, which further includes one or more processors. The server architecture 200 further includes a memory 202 containing an operating system 201, a storage device 208 containing a content directory 210, a network adapter 206, an advertisement module 212, a communication module 214, a recommendation module 216, a programming module 218, and a personalization module 220, each interconnected by an interconnect 223 and powered by a power supply 224.

The server architecture 200 can be embodied as a single- or multi-processor system that preferably implements a high-level module to receive performance data 112 and subscriber preferences 103 for determining the appropriate excitement levels for the performances 110. The received performance data 112 and subscriber preferences 103 are communicated via the network adapter 206 in packets of information according to predefined protocols known in the art. The network adapter 206 includes circuitry and one or more ports to couple the recommendation server 102 to the network 104.

The performance data 112 and subscriber preferences 103 can be stored in the storage device 208 for retrieval by the processor subsystem 204 and memory 202. The storage device 208 stores data and information in support of the techniques introduced herein.

The content directory 210 is a customized list of pointers 211 to the storage locations of the performances 110, or portions of the performances. In one embodiment, the content directory 210 can contain various metadata describing performances 110, including for example, information regarding the resolution of the performance file and time stamps demarking events associated with a performance file so that individual events related to a performance 110 are accessible for immediate viewing without viewing the entire performance 110 or even the beginning of the performance 110. In one embodiment, the content directory 210 has pointers 211 to both free and paid performances, as well as both cloud-based (Internet) and private content, such as content contained on a DVR, PVR, VCR, media server, private Local Access Network (LAN), and/or private Wide Area Network (WAN), for example. In another embodiment, the content directory 210 contains the actual performance itself, not a pointer 211.

The storage device 208 can be implemented on one or more disks (e.g., a RAID group) or any other type of mass storage device(s). Alternatively, or additionally, such data may be stored on any type of attached array of writable storage media, such as magnetic disk or tape, optical disk (e.g., CD-ROM or DVD), flash memory, solid-state disk (SSD), electronic random access memory (RAM), micro-electro mechanical media and/or any other similar media adapted to store information. However, as illustratively described herein, the information is stored on a single non-volatile mass storage device 212.

The server architecture 200 includes a processor subsystem 204 that includes one or more processors. The processor subsystem 204 is configured to perform some of the techniques introduced herein, such as ranking performances based on event characteristics related to each performance 110, and recommending a ranked performance to a subscriber 108, based on the subscriber's preferences 103.

The memory 202 illustratively comprises storage locations (not shown) that are addressable by the processor subsystem 204 and modules 212 through 220 for storing software program code and data structures associated with the presently disclosed techniques. The processor subsystem 204 and components may, in turn, comprise processing elements and/or logic circuitry configured to execute the software code and manipulate the data structures. The operating system 201, portions of which are typically resident in memory 202 and executed by the processor subsystem 204, functionally organizes the server architecture 200 by (among other things) configuring the processor subsystem 204 to invoke and/or execute performance recommendation-related operations in support of some aspects of the technique introduced here. It will be apparent to those skilled in the art that other processing and memory implementations, including various computer readable storage media, may be used for storing and executing program instructions pertaining to the technique introduced here.

The operating system 201 can be software, such as Microsoft Windows, MAC OS X, or Linux, that manages the components 202 through 220 and provides common services for efficient execution in support of some aspects of the technique introduced here.

One skilled in the art will appreciate that the server architecture 200 has a structure that is similar to that used to operate the client system 106. For example, the internal architecture of client system 106 includes a network adapter 206, processor subsystem 204, memory 202, and storage device 208, each configured to communicate via interconnect 223 and powered by power supply 224.

Figure 3:
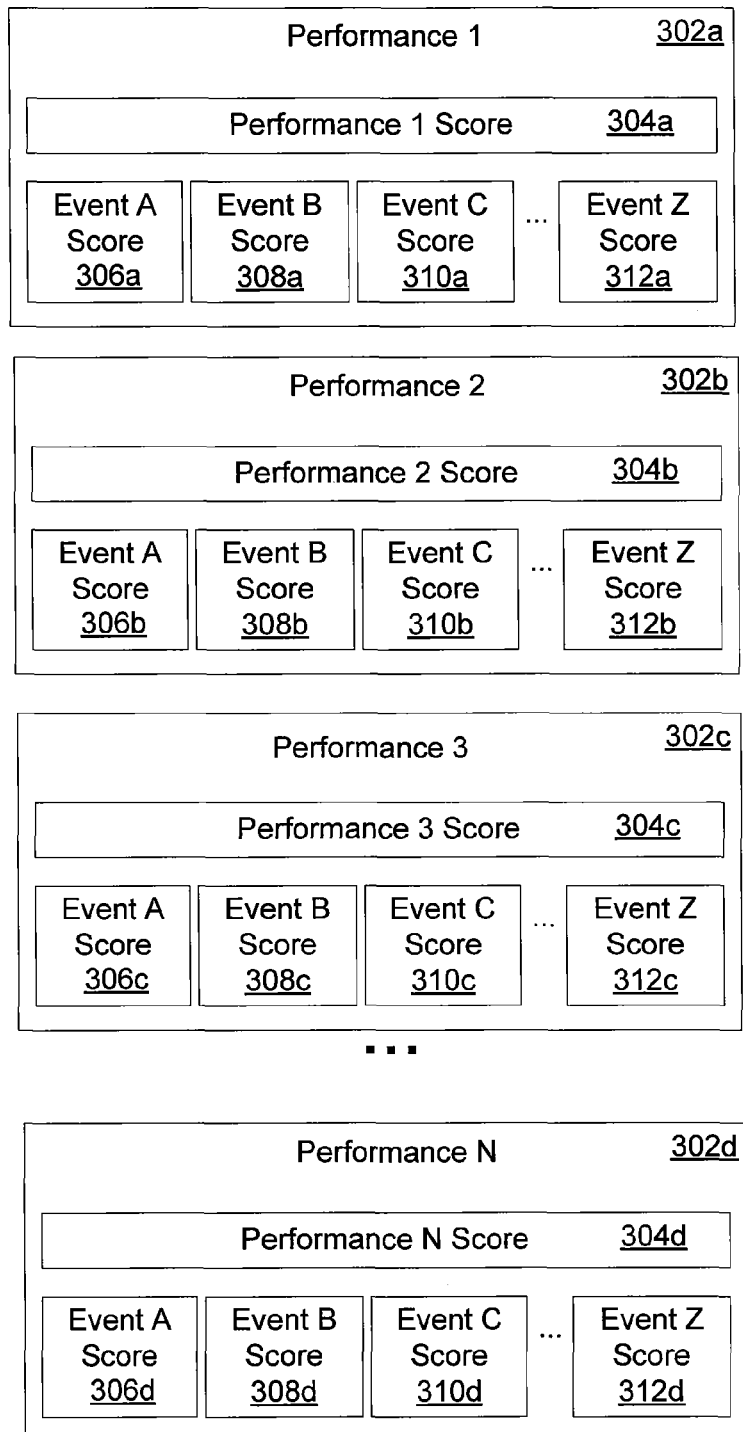
FIG. 3 illustrates an example of a list of performances ranked by their performance scores.
Figure 4:
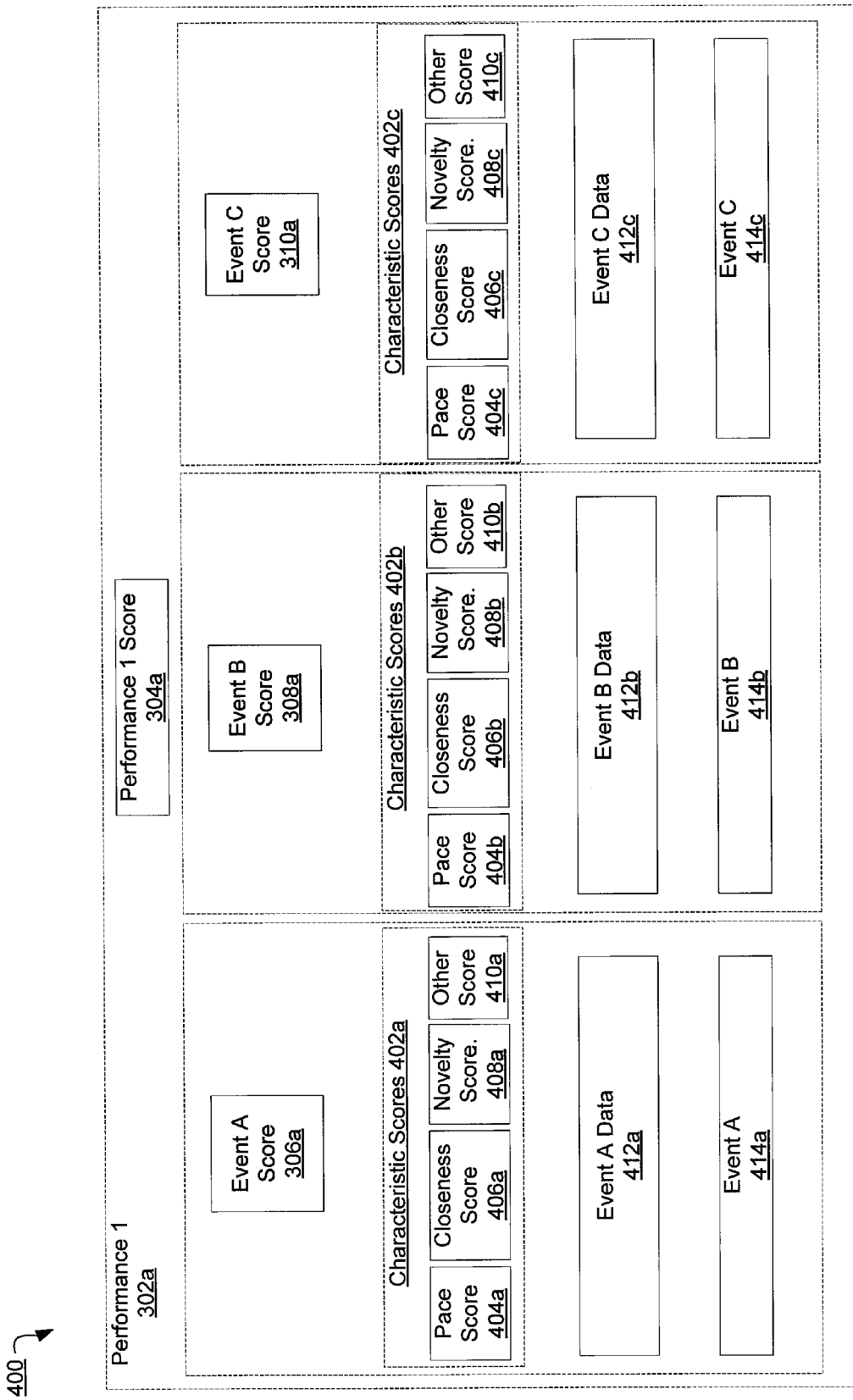
FIG. 4 illustrates an example performance having a series of events, each event having a score determined based on one or more characteristic scores.
Figure 5:
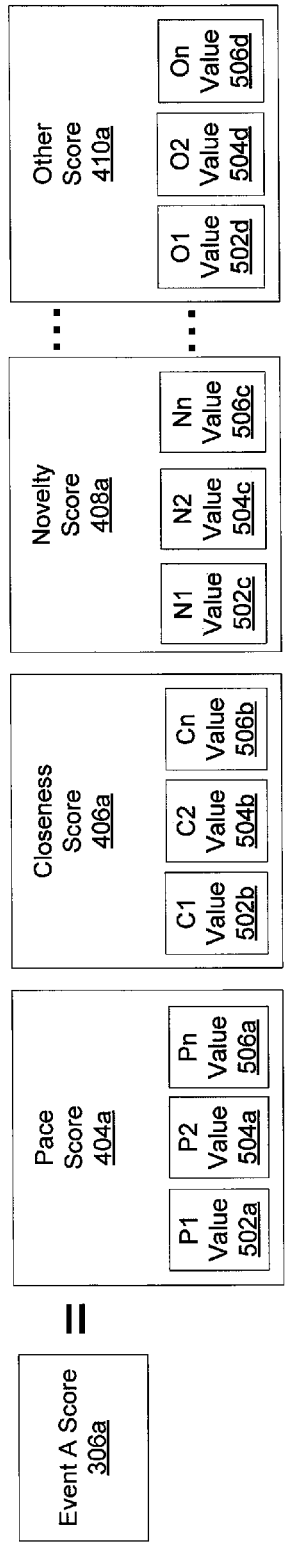
FIG. 5 illustrates an event score determined based on a weighted average of normalized characteristic scores associated with the pace, closeness of scores, and novelty of the event.

The recommendation module 216 determines the excitement level ("performance score") for a performance 110 based on discrete events associated with the performance and sends performance recommendations to the subscriber 108. As further explained below and as illustrated in FIG. 3, FIG. 4, and FIG. 5, discrete events are scored by determining and scoring event characteristics from performance data 112 that are associated with the particular performance.

In some embodiments, one or more ranked performances are recommended to a subscriber of an online recommendation service, in such a way as to preserve the excitement of the recommended performances. The online recommendation service may be a commercial service or a free service in which a subscriber can create and store preferences. A subscriber preference can describe the subscriber's likes and dislikes for a particular type of performance, team, league, player, division, conference, game, or sport, for example. Additionally or alternatively, a subscriber preference can specify the type of event that a subscriber finds exciting, such as a crash within an auto racing performance or an occurrence of a fight during a hockey game, for example.

Subscriber preferences can influence the recommendation(s) made to the subscriber by increasing or decreasing an amount that a subscriber-preferred characteristic affects the excitement-level of the performance as determined by the online recommendation service.

A recommendation for the one or more performances made to the subscriber thus preserves the excitement of the performance by not revealing the score of the game, game statistics, or other spoilers, so that the excitement of the performance can be naturally experienced by the subscriber, who may be unaware of the outcome.

The communication module 214 sends performance recommendations and/or an alert of an exciting event to a subscriber 108 via a preferred means of communication as expressed in the subscriber preferences 103. Communication means include, but are not limited to, email, text message (via direct SMS or text broadcast), Internet posting (via direct status posting, such as through a social network, or via a broadly accessible website), and voicemail, for example. The subscriber 108 can further customize how communications are received, such as specifying the frequency of communications, and/or the extent of the information communicated within each communication, for example.

The programming module 218 sends recording instructions to a DVR, PVR, such as the client system 106. These recording instructions allow for the recording of a recommended performance, or portion thereof, by the client. In one embodiment, the instructions may allow for the recording of performances 110, or portions thereof, from both freely available and/or paid sources. When a commercial source of the performance is used, the programming module 218 may include a database with a set of subscriber preferences, such as authentication information, and a secured repository for payment information, such as credit card information.

While some individuals may wish to watch a performance 110 from beginning to end, with the abundance of stored performances 110 now available, a subscriber 108 can use the personalization module 220 to watch only those portions of a performance 110 that the subscriber 108 finds exciting. The personalization module 220 receives ranked performances from the recommendation module 216, as further explained below, and further analyzes the ranked performances to determine when the performances become exciting to the subscriber 108 based on the subscriber preferences 103.

In one embodiment, the personalization module 220 creates time stamps that determine, for example, when a subscriber 108 should begin recording or watching (a "watch-from-time") a particular performance to maximize the excitement of watching the performance 110, or portion of the performance 110, in the minimum amount of time. The watch-from-time precedes a peak excitement level that has been determined for an exciting event so that the subscriber 108 can experience the build up leading to the peak excitement level. The granularity of the time stamps may vary by performance and subscriber preference. For example, in an exemplary embodiment, time stamps may be recorded based on a particular type of performance, such as a particular quarter, period, half, or inning of a sporting event. In another example, the time stamps may be based on a specific time interval indicating a portion of a performance, which may or may not include the beginning or the end of the performance.

Similarly, in one embodiment, a watch-to-time can be provided by the personalization module 220. The watch-to-time corresponds to a time occurring after the peak excitement level of an event has ended to indicate the time to stop watching and/or recording the performance. A single performance 110 can have multiple watch-from-times with corresponding watch-to-times, each associated with the occurrence of an exciting associated with the performance 110.

In one embodiment, one or more performances 110 are recommended to a subscriber based on the subscriber's available time for consuming performances 110 (referred to as a "viewing-time"). The viewing-time is a subscriber-selected duration that influences the quantity and length of performances and/or performance events that are recommended to a subscriber 108.

In some embodiments, viewing-times can be combined with subscriber preferences 103 to construct a list of preferred events for viewing that fit within the subscriber's viewing-time. For example, a subscriber may have a preference for baseball, basketball, and college football, but not soccer or any performance with a low score. If the subscriber 108 in this example has 45 minutes of viewing-time, then the personalization module 220 can limit recommendations to exciting events conforming to that subscriber's preferences. In this scenario, the personalization module 220 may recommend, for example, two highly ranked baseball performances, each having two exciting five-minute events; a single basketball performance having three exciting events, each lasting five minutes; and a single college football performance with one exciting ten-minute drive that leads to a tie-breaking touchdown.

An advertising module 212 may work in conjunction with the personalization module 220 to provide advertisers and sponsors with a means of communicating relevant ads that match a specific subscriber's demographics and other subscriber-specific information, as expressed in the subscriber preferences 103. For example, an ad for sports shoes can be customized with a subscriber's favorite football player and sent to the client system 106 of the subscriber 108. In another example, an ad can be tailored to the subscriber's age, gender, and expressed preference for non-violent sports or reality TV shows. The advertising module 212 can determine and/or process a fee from a third-party for redirecting a subscriber to content associate with the third-party. For example, the advertising module 212 can direct the subscriber to a web-link that redirects, or otherwise establishes a communication link to content provided by the third party's website. The advertising module 212 can process a fee from the third-party for redirecting the subscriber to the third party's content.

FIG. 3 illustrates an example of a list of performances 300 ranked by excitement level (also referred to as "performance score"). For illustrative purposes, the ranked list of performances 300 are illustrated as four performances 302a, 302b, 302c, and 302d; however, there may be more or less performances. Performance "n" (302d) indicates a performance ranked in an nth position within the ranked list of performances 300. Performance "1" (302a) is substantially identical to performance "2" (302b), performance "3" (302c), and performance "n" (302d), therefore, the description of performance "1" similarly applies to these performances.

Performance 1 302a contains a performance score 304a and event scores 306a, 308a, 310a, and 312a. Performance 1 302a may contain more or less events, but for illustrative purposes, performance 1 302a will be described based on event scores 306a, 308a, 310a, and 312a. Each event score 306a, 308a, 310a, and 312a represents an exciting event related to the performance 302a. As described below, each event score 306a, 308a, 310a, and 312a is scored by the recommendation module 216 and used to compute the performance score 304a. The performance score 304a is used to rank the performance 302a in an order based on the other performance scores 304b, 304c, and 304d of the other respective performances 302b, 302c, and 302d. In one embodiment, the ranked list of performances 300 are ordered from performance 302a, having the highest performance score 304a, to performance 302d, having a lowest performance score 304d, however, other orderings are contemplated and known in the art.

FIG. 4 illustrates the example performance 302a having a series of events 414a, 414b, and 414c, each event having a respective event score 306a, 308a, and 310a, based on one or more characteristic scores 402a, 402b, 402c, which are derived from event data 412a, 412b and 412c. As previously discussed, the performance score 304a is determined based on the events 414a, 414b, and 414c related to a performance 302a. Each event has corresponding event data, such as 412a, 412b, and 412c, which is used to compute each respective event score 306a, 308a, 310a, and 312a.

In one embodiment, the event data 412a, 412b, and 412c is extrapolated from the performance data 112, described above. Event data, such as 412a, 412b and 412c, includes information about a corresponding event 414a, 414b and 414c. The information can include structured and/or unstructured information containing details about the event, such as statistics used by the recommendation module 216 to determine event scores 306a, 308a, 310a, and 312a.

In one embodiment, each event score 306a, 308a, 310a, and 312a is determined based on one or more characteristic scores 402a, 402b, and 402c. A characteristic score, such as 402a, is a score applied to one or more event characteristics determined from the event data 412a. An event characteristic (or "characteristic") is a specific, gradable, qualified aspect of an event as determined from the event data. For example, a characteristic can be a score volatility, a narrow score margin, an upset within a performance, an unexpected score, a performance event's pacing, a closeness of scores, or a novelty. However, a characteristic can be generalized to accommodate different types of events and/or performances.

In one embodiment, a characteristic can be specific to a particular type of event and/or performance. For example, some performances have unique characteristics, such as a specific number of field goals scored in a football game, or RBIs in an inning of a baseball or softball performance.

In one embodiment, a characteristic can be generic and apply to multiple types of events and/or performance types. For example, FIG. 4 illustrates characteristic scores 402a based on the pace of the performance 404a, the closeness of scores within the performance 406a, and the novelty of the performance 408a. Other characteristics 410a are contemplated; however, for illustrative purposes, only characteristics scores 404a, 406a and 408a are discussed.

FIG. 5 illustrates an example event score 306a determined based on a function 508 of a weighted average of normalized characteristic scores derived from the characteristic score 404a associated with pace, characteristic score 406a associated with the closeness score, and characteristic 408a associated with novelty of the event 414a. A particular characteristic score, such as a characteristic score 404a, for example, may have sub-characteristic values 502a, 504a, and 506a. For example, a single event 414a occurring during a football performance may include a twenty-minute drive leading to a game-winning touchdown. Within this drive (the "event"), several of the football plays can be characterized as having a certain pace value. For instance, a no-huddle offensive play can be characterized as having a high pace value (502a), and another play within that same event 414a can be characterized by having a low pace value (504a). Each of the sub-characteristic values 502a, 504a and 506a are used to determine the overall pace characteristic score 404a associated with pace.

Similarly, other overall characteristics scores 406a, 408a, and 410a can be determined from their respective sub-characteristic values. For example, the characteristic score 406a associated with the closeness of the score can be determined based on sub-characteristics values 502b, 504b, and 506b; the characteristic score 408a associated with novelty can be determined based on sub-characteristics values 502c, 504c, and 506c; and other characteristics scores 410a can be determined based on other sub-characteristics values 502d, 504d, and 506d. In one embodiment the overall characteristic score 404a associated with pace, along with the overall characteristic score 406a associated with the closeness of the score, the overall characteristic score 408a associated with novelty, and, optionally, other overall characteristics scores 410a, are used by the recommendation module 216 to determine the overall event score 306a.

In one embodiment, the sub-characteristic values, such as 502a, 504a and 506a, for example, can be averaged together as part of a function to determine the characteristic score 404a. For example, function 508 illustrates sub-functions 510a, 510b, and 510c. Each sub-function 510a, 510b, and 510c represents the calculation of sub-characteristic value 502a, 504b, and 506c, for example. Within each sub-function, the average 512a of the sub-characteristic value 502a is determined and added to other averages 512b and 512c of sub-characteristic values 504b and 506c.

In another or additional embodiment, weights 514a, 514b and 514c can be applied to one or more of the sub-characteristic values 502a, 504a and 506a to influence the significance of a characteristic value in the determination of the overall characteristic score 404a. For instance, sub-function 510a contains the average 512a of a weighted 514a sub-characteristic value 502a, within one or more standard deviations 518a.

Additionally, the sub-characteristic values 502a, 504a, 506a, 502b, 504b, and 506b can be normalized (not shown), so that the total of the sub-characteristic values are approximately equal to a certain value, such as 100, for example, so that the resulting performance score 540 can be scaled between 0 and 100.

The closeness sub-functions 520a, 520b, and 520c can be determined similar to the sub-functions 510a, 510b, and 510c, previous described. For example, sub-function 520a can contain the average 522a of a weighted 524a closeness value 502b, within one or more standard deviations 52a. Similarly, sub-functions 520b and 520c can contain respective averaged 522b/522c weighted 524b/524c closeness values 504b/506b, within one or more standard deviations 518b/528c.

In one embodiment, a sub-function 530 can contain sub-characteristics 502c, 504c and 506c that are not averaged or weighted.

An overall performance score 540 of a performance 302a is, therefore, a function 508 of the event scores 306a, 308a, and 310a, which are based on characteristic scores 404a, 406a, and 408a within the performance 302a. The recommendation module can use the performance scores to rank multiple performances 300 based on the performances' respective performance scores. As previously discussed, the recommendation module 216 recommends one or more ranked performances to the subscriber 108 of an online recommendation service 100 while making sure that the excitement of the recommended performances is not undermined.

The techniques introduced above, including at least modules 212 through 220 can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any module with one or more processors, etc.). For example, a machine-accessible medium includes recordable/nonrecordable media (e.g., read-only memory (ROM), random access memory (RAM), magnetic disk storage media, optical storage media, flash memory devices, etc.).

The term "logic," as used herein, can include, for example, special-purpose hardwired circuitry, software, and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for recommending online media performances, comprising:

at a server computing system, generating time stamps for the online media performances to indicate a series of discrete events related to a respective performance of the online media performances;

generating, at the server computing system, scoring for a portion of the discrete events of one or more of the online media;

generating, at the server computing system, scoring for the one or more online media performances at least based on the scoring of the portion of discrete events;

generating, at the server computing system, a recommendation message for the one or more online media performances in response to the scoring of the portion of discrete events satisfying criteria, the criteria including one or more subscriber preferences; and sending the recommendation message from the server computing system to a client.

2. The method of claim 1, wherein the one or more subscriber preferences effect whether an online media performance is recommended to the subscriber.

3. The method of claim 1, wherein the one or more subscriber preferences adjusts a weight applied to a performance datum of the performance data, wherein the weight effects the scoring of the one or more online media performances.

4. The method of claim 1, wherein the recommendation message is based at least in part on available viewing time for the online media performance.

5. A method for recommending media performances, comprising:
  at a server computing system, generating time stamps for the media performances to indicate a series of discrete events related to a respective performance of the media performances, the media performances are sports activities;
  generating, via the server computing system, scoring for a portion of the discrete events of one or more of the media performances;
  generating, via the server computing system, scoring for the one or more media performances at least based on the scoring of the portion of discrete events;
  generating, at the server computing system, a recommendation message for the one or more media performances, wherein the recommendation message is at least based on the scoring of the portion of discrete events satisfying criteria of the sports activities; and
  sending the recommendation message from the server computing system to a client device.

6. The method of claim 5, wherein an interval spacing of the time stamps varies based on the selected sports activity of the group of sports activities.

7. A method for recommending media performances, comprising:
  at a server computing system, generating time stamps for the media performances to indicate a series of discrete events related to a respective performance of the media performances;
  generating, at the server computing system, scoring for a portion of the discrete events of one or more of the media performances;
  generating, at the server computing system, scoring for the one or more media performances at least based on the scoring of the portion of discrete events;
  generating, at the server computing system, a recommendation message for the one or more media performances, wherein the recommendation message is at least based on the scoring of the portion of discrete events; and
  sending the recommendation message from the server computing system to a client device, wherein the sending of the recommendation message to the client device includes sending a watch-from-time to indicate a time to begin viewing or recording a discrete event of the one or more discrete events related to the recommended online media performance, wherein the watch-from-time proceeds a peak excitement time of the discrete event.

8. The method of claim 7, wherein the sending of the recommendation message includes sending a watch-to-time to indicate a time to stop viewing the one or more discrete events related to the recommended media performance, the watch-to-time to succeed the peak excitement time of the discrete event.

9. The method of claim 8, wherein the scoring of the portion of the discrete events is determined at least based on: a pacing score, the pacing score determined based on one or more pace values, a closeness score, the closeness score determined based on one or more closeness values, and a novelty score, the novelty score determined based on one or more novelty values.

10. The method of claim 9, wherein a pace value of the one or more pace values is a measure of a tempo or relative rate of change associated with the portion of the discrete events, wherein a closeness value of the one or more closeness values is at least based on a measure of a score margin between two or more scores of the portion of the discrete events, and wherein a novelty value of the one or more novelty values is a measure of uniqueness associated with a portion of the discrete events.

11. A method for recommending one or more online sports presentations of a plurality of online sports presentations to one or more subscribers of an online sports recommendation service, the method comprising:
  at a server computing system, generating time stamps for the online sports presentations to indicate a series of discrete events for each respective one of the plurality of online sports presentations;
  generating, at the server computing system, scoring for a portion of the discrete events of the plurality of online sports presentations based on game characteristics determined from game data associated with the plurality of online sports presentations;
  generating, at the server computing system, scoring for the plurality of online sports presentations at least based on discrete event scores associated with a respective sports presentation of the plurality of online sports presentations;
  generating, at the server computing system, generating one or more recommendations for online sports presentations of the plurality of online sports presentations for a subscriber of the one or more subscribers without revealing any statistics or highlights of any recommended performance, wherein the recommendation is at least based on: the scoring of the portion of discrete events, one or more subscriber preferences, and a watch-from-time, wherein the watch-from-time is based on a peak excitement level associated with one or more of the portions of discrete events; and
  sending the one or more recommendations from the server computing system to a client device for the subscriber.

12. The method of claim 11, wherein the game data is statistical data associated with details of the one or more online sports presentations.

13. The method of claim 12, wherein the game data is selected from at least a group consisting of game clock time data, field position data, play type data, player statistic data, and current team score data.

14. The method of claim 13, wherein the game characteristics are at least based on a pacing score, with the pacing score based on one or more pace values, wherein a pace value of the one or more pace values is a measure of a tempo or relative rate of change associated with the portion of the discrete events.

15. The method of claim 13, wherein the game characteristics are at least based on a closeness score, with the closeness score based on one or more closeness values, and wherein a closeness value of the one or more closeness values is a measure of a score margin between two or more scores of the portion of discrete events.

16. The method of claim 13, wherein the game characteristics are at least based on a novelty score, with the novelty score based on one or more novelty values, and wherein a novelty value of the one or more novelty values is a measure of uniqueness associated with an online sports presentation of the one or more online sports presentations.

17. The method of claim 12, wherein the discrete event scores associated with an online sports presentation of the one or more online sports presentations are normalized such that a score of the sports presentation is equal to or less than 100.

18. A recommendation server, comprising:
a communication interface;
a storage device; and
a processor system in communication with the communication interface and the storage device, the processor system generates time stamps for sports presentations to indicate a series of discrete events for each respective one of the sports presentations and generates scoring for at least a portion of the discrete events of the plurality of sports presentations based on game characteristics determined from game data associated with the plurality of sports presentations, the processor system generates one or more recommendations for sports presentations of the plurality of sports presentations wherein the recommendations are at least based on the scoring of the portion of discrete events and one or more subscriber preferences, the processor system sends the one or more recommendations from the recommendation server to a client device associated with the one or more subscriber preferences via the communication interface.

19. The recommendation server of claim 18, wherein:
the processor system generates the one or more recommendations by include a watch-from-time to indicate a time to begin viewing or recording a discrete event of the one or more discrete events related to the sports presentations, wherein the watch-from-time proceeds a peak excitement time of the discrete event.

20. The recommendation server of claim 18, wherein:
wherein the game characteristics are at least based on one or more closeness values, wherein a closeness value of the one or more closeness values is a measure of a score margin between two or more scores of the portion of discrete events.

* * * * *